US011997962B2

(12) United States Patent
Mueller et al.

(10) Patent No.: US 11,997,962 B2
(45) Date of Patent: Jun. 4, 2024

(54) AUTOMATED GROWING SYSTEMS

(71) Applicant: AGRIFORCE GROWING SYSTEMS LTD., Vancouver (CA)

(72) Inventors: Ingo Mueller, Vancouver (CA); Troy McClellan, Vancouver (CA)

(73) Assignee: Agriforce Growing Systems Ltd., Vancouver (CA)

( * ) Notice: Subject to any disclaimer, the term of this patent is extended or adjusted under 35 U.S.C. 154(b) by 24 days.

(21) Appl. No.: 17/983,109

(22) Filed: Nov. 8, 2022

(65) Prior Publication Data

US 2023/0059821 A1 Feb. 23, 2023

Related U.S. Application Data

(63) Continuation of application No. 17/638,668, filed as application No. PCT/CA2020/051161 on Aug. 26, 2020, now Pat. No. 11,528,859.

(51) Int. Cl.
*A01G 31/04* (2006.01)
*A01G 31/06* (2006.01)

(52) U.S. Cl.
CPC .................. *A01G 31/06* (2013.01)

(58) Field of Classification Search
CPC ...... A01G 31/06; A01G 31/04; A01G 31/042; A01G 9/247; A01G 9/047
See application file for complete search history.

(56) References Cited

U.S. PATENT DOCUMENTS 3,603,034 A 9/1971 Maxwell-Stewart
3,667,157 A 6/1972 Longhini
(Continued)

FOREIGN PATENT DOCUMENTS

CN 102468502 A 5/2012
CN 107820949 A 3/2018
(Continued)

OTHER PUBLICATIONS

PCT-WIPO; International Search Report and Written Opinion of International Application No. PCT/CA2020/051161 dated Jan. 6, 2021.
(Continued)

*Primary Examiner* — Monica L Perry
(74) *Attorney, Agent, or Firm* — Norton Rose Fulbright Canada LLP; Maya Medeiros

(57) ABSTRACT

An automated growing system comprises a plurality of vegetative production lines for moving a plurality of planted growing channels from a first end to a second end of a growing area, a plurality of flowering production lines for moving the channels from the second end to the first end, and a first conveyor belt for moving planted growing channels from the plurality of vegetative production lines to the plurality of flowering production lines. Each production line may comprise a frame, a conveyor assembly configured to receive growing channels, a fertigation delivery line comprising a plurality of regulators spaced therealong for depositing fluid into the growing channels, a drainage trough, and an air supply duct positioned under the conveyor assembly, the air supply duct comprising a plurality of openings therein for delivering conditioned air to plants growing in the growing channels. Each growing channel may comprise a trough having a first end higher than a second end, a flange extending laterally from each of a pair of opposed lateral edges of the trough and having a plurality of leach lines on an upper surface thereof extending a different predetermined distance from the first end toward the second end, and a fertigation receiving structure attached to the first end of the trough and configured to direct fluid falling therein into the leach lines of each flange.

14 Claims, 11 Drawing Sheets

(56) References Cited

U.S. PATENT DOCUMENTS

| | | |
|---|---|---|
| 4,337,986 A | 7/1982 | Haub et al. |
| 4,476,651 A | 10/1984 | Drury |
| 10,004,187 B1 | 6/2018 | Van Wingerden |
| 10,051,799 B1 | 8/2018 | Van Wingerden |
| 10,058,040 B2 | 8/2018 | Daas et al. |
| 2006/0150490 A1 | 7/2006 | Dillen et al. |
| 2015/0082696 A1 | 3/2015 | Barendregt et al. |
| 2015/0373927 A1 | 12/2015 | Paans |
| 2016/0183486 A1* | 6/2016 | Kabakov ............... A01G 31/02 47/62 R |
| 2018/0206422 A1* | 7/2018 | Vandecruys ............. A01G 7/02 |
| 2018/0235156 A1* | 8/2018 | Blair .................... A01G 27/003 |
| 2019/0021249 A1 | 1/2019 | Ivanescu et al. |
| 2019/0257106 A1 | 8/2019 | Baker |
| 2020/0305369 A1 | 10/2020 | Ikeuchi et al. |
| 2021/0161082 A1 | 6/2021 | Kickert |
| 2022/0225588 A1 | 7/2022 | Cuson et al. |
| 2023/0189730 A1* | 6/2023 | Kobelt .................. A01G 31/02 47/62 R |

FOREIGN PATENT DOCUMENTS

| | | |
|---|---|---|
| CN | 109328729 A | 2/2019 |
| CN | 110089408 A | 8/2019 |
| EP | 0051647 B1 | 9/1984 |
| KR | 101488158 B1 | 2/2015 |
| WO | 2016195472 A1 | 12/2016 |
| WO | 2018016609 A1 | 1/2018 |
| WO | 2019073073 A1 | 4/2019 |

OTHER PUBLICATIONS

China National Intellectual Property, First Office Action issued in Chinese Patent Application No. 202080073940.7, dated Mar. 9, 2023.

* cited by examiner

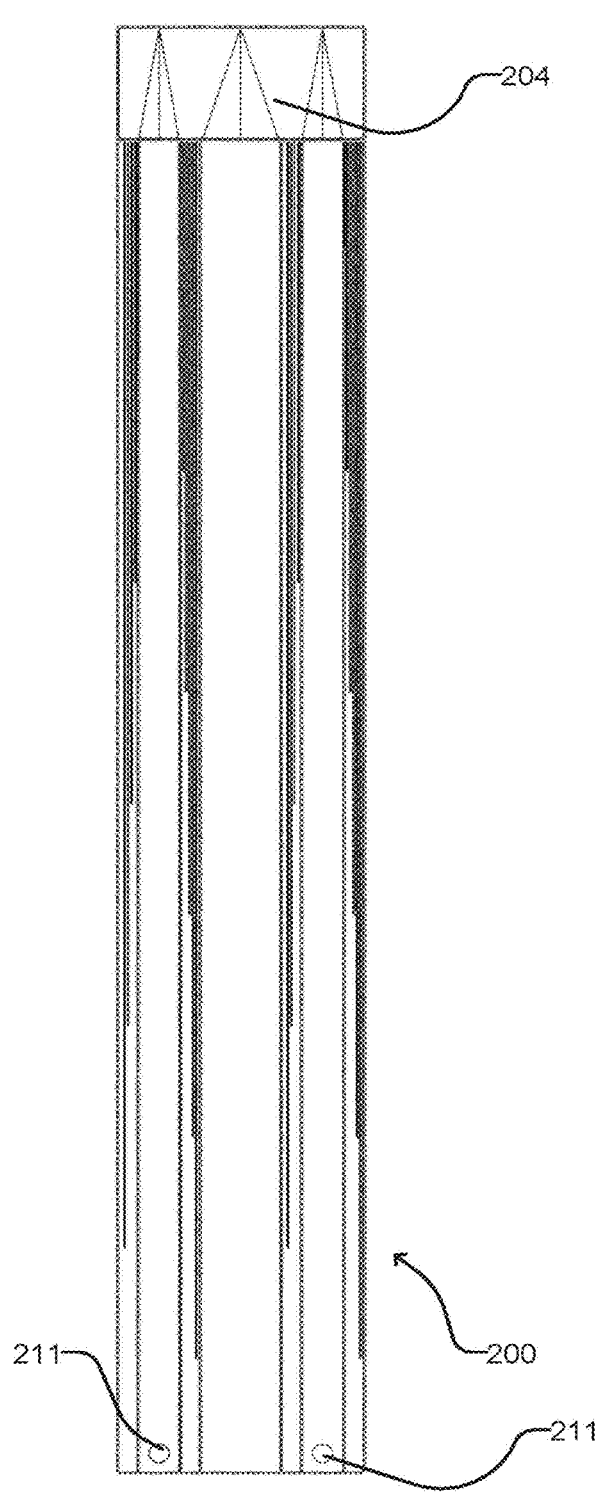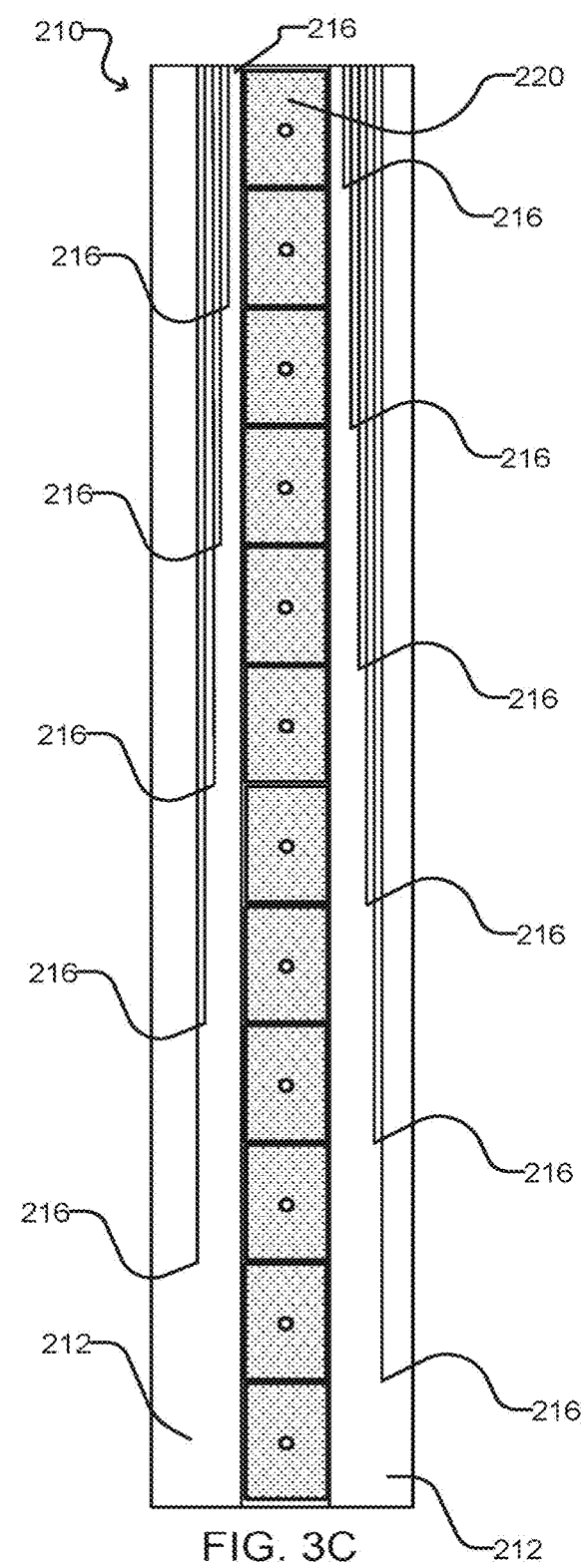

AUTOMATED GROWING SYSTEMS

CROSS-REFERENCE TO RELATED APPLICATIONS

This application is a continuation of U.S. application Ser. No. 17/638,668 filed Feb. 25, 2022 which is a 371 of International Application No. PCT/CA2020/051161 filed Aug. 26, 2020 which claims the benefit of and priority to U.S. Provisional Application No. 62/891,562 filed Aug. 26, 2019 the contents of which are hereby incorporated herein by reference.

TECHNICAL FIELD

The present disclosure relates to automated systems for growing plants, and related apparatus and methods.

INTRODUCTION

There are industry and product standard practices for growing plants. Building on original manual practices, growing techniques have been advanced, automated, improved, and tailored to some extent for each crop. With automated technology becoming more and more common in the cultivation industry, many different designs are emerging. However, current facilities typically implement standard or non-optimized automated technology, and can lead to inefficient production and redundant components.

There is a need for improved systems for growing crops, or at least alternatives.

SUMMARY

An aspect of the present disclosure provides a channel for growing a plurality of plants. The channel comprises: a trough having a first end, a second end, and a pair of opposed lateral edges extending between the first end and the second end, the trough held at an incline such that the first end is higher than the second end; a flange extending laterally from each of the pair of opposed lateral edges of the trough, each flange having a plurality of leach lines on an upper surface thereof, each leach line extending a different predetermined distance from the first end toward the second end; and a fertigation receiving structure attached to the first end of the trough and configured to direct fluid falling therein into the leach lines of each flange.

Another aspect of the present disclosure provides a production line for an automated growing system. The production line comprises: a frame having a first end and a second end; a conveyor assembly supported by the frame, the conveyor assembly configured to receive growing channels at the first end and move the growing channels toward the second end; a fertigation delivery line supported by the frame, the fertigation delivery line extending between the first and second ends and positioned above and to a first lateral side of the conveyor assembly, the fertigation delivery line comprising a plurality of regulators spaced therealong for depositing fluid into fertigation receiving structures of the growing channels; a drainage trough supported by the frame, the drainage trough extending between the first and second ends and positioned to a second lateral side of the conveyor assembly; and an air supply duct supported by the frame, the air supply duct extending between the first and second ends and positioned under the conveyor assembly, the air supply duct comprising a plurality of openings therein for delivering conditioned air to plants growing in the growing channels.

Another aspect of the present disclosure provides an automated growing system comprising: a plurality of vegetative production lines in a vegetative portion of a growing area for moving a plurality of planted growing channels from a first end of the growing area to a second end of the growing area; a plurality of flowering production lines in a flowering portion of the growing area for moving a plurality of planted growing channels from the second end of the growing area to the first end of the growing area; and a first conveyor belt extending laterally across the second end of the growing area for moving planted growing channels from the plurality of vegetative production lines to the plurality of flowering production lines.

Further aspects and details of example embodiments are set forth below.

DRAWINGS

The following figures set forth embodiments in which like reference numerals denote like parts. Embodiments are illustrated by way of example and not by way of limitation in the accompanying figures.

FIG. 3B is a top view of the growing channel of FIG. 3 with an alternative drain configuration.

FIG. 3C is a top view of portion of a growing channel with growing pods inserted therein in which the basin is omitted and the trough is shown stretched in the lateral dimension to illustrate the different lengths of the leach lines.

DETAILED DESCRIPTION

Figure 1:
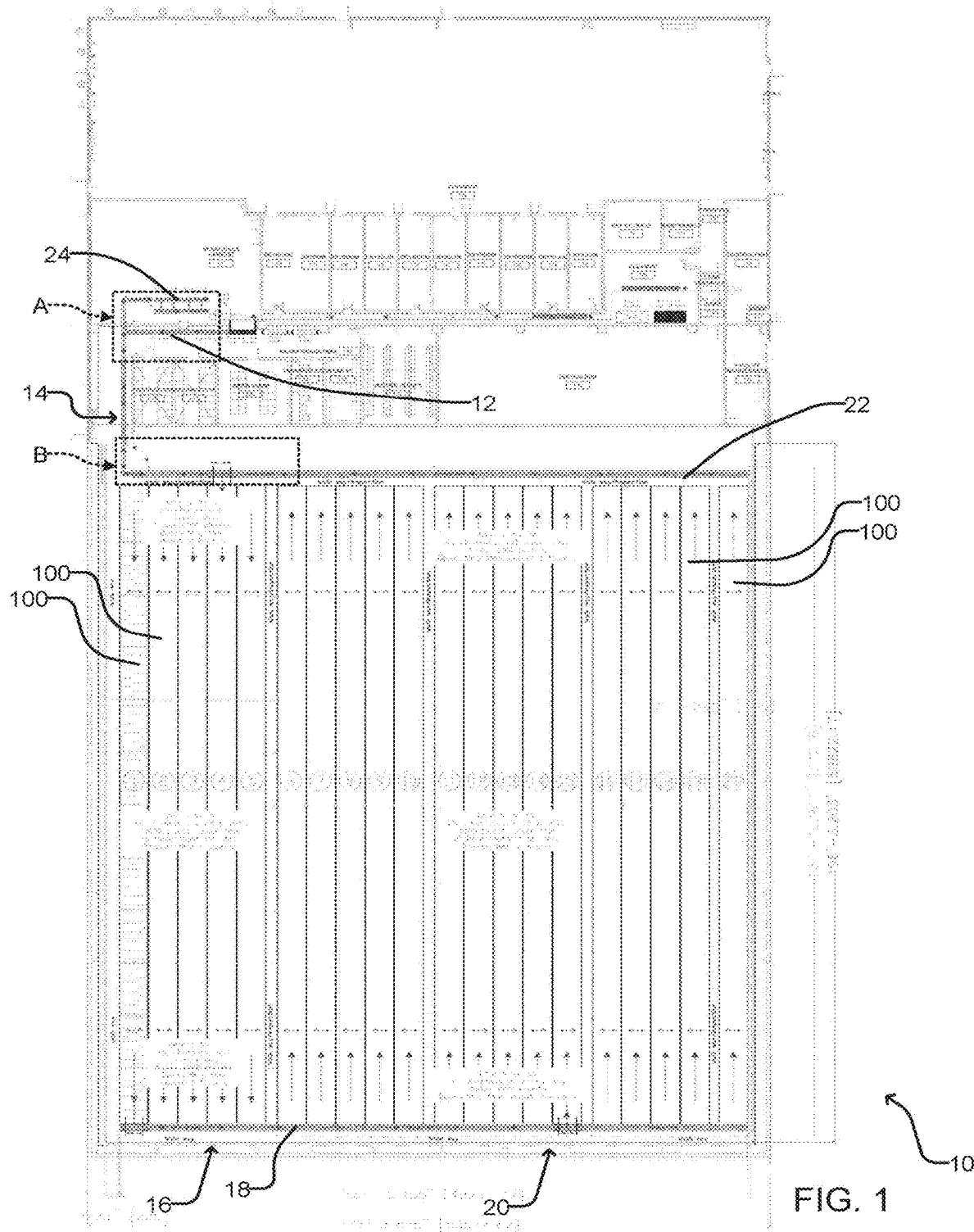
FIG. 1 shows an automated growing system according to an example embodiment of the present disclosure.

The following describes example automated systems for growing plants, and related apparatus and methods.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures and components are not described in detail to avoid obscuring the examples described. The description is not to be considered as limited to the scope of the examples described herein.

FIG. 1 shows an automated growing system 10 according to an example embodiment of the present disclosure. The growing system provides all essential growing mechanisms from micropropagation stage to harvest with minimal human interaction. The plants are on production lines of the growing system for most of the growth cycle, as discussed below. The growing system 10 may be installed in a structure for growing plants such as a greenhouse. In some embodiments, the structure is part of a secure and licensed facility for growing *cannabis*, for example. In some embodiments, the structure comprises a structure as disclosed in US Provisional Patent Application No. 62/815,131 filed Mar. 7, 2019 and PCT Patent Application No. PCT/CA2020/050302 filed Mar. 6, 2020, which are hereby incorporated by reference herein. In some embodiments, the structure has a first end farther from the equator and a second end closer to the equator.

The growing system 10 comprises a planting room conveyor belt 12 onto which growing channels 200 (shown in FIG. 2A, for example) that have been loaded with pods containing cultivated varieties of plants (referred to herein as "cultivar") are placed. Before being loaded into the channels 200, cultivar matures within micropropagation areas 145 shown in FIG. 5 which is an expanded view of the automated growing system of FIG. 1.

Details of the channels 200 are discussed below with reference to FIG. 3. In some embodiments, the growing system 10 extends through a main growing area of the structure, as well as into several additional rooms, such as for example micropropagation rooms, planting rooms, harvesting rooms. Such additional rooms will be generally referred to herein as processing rooms.

Figure 1A:
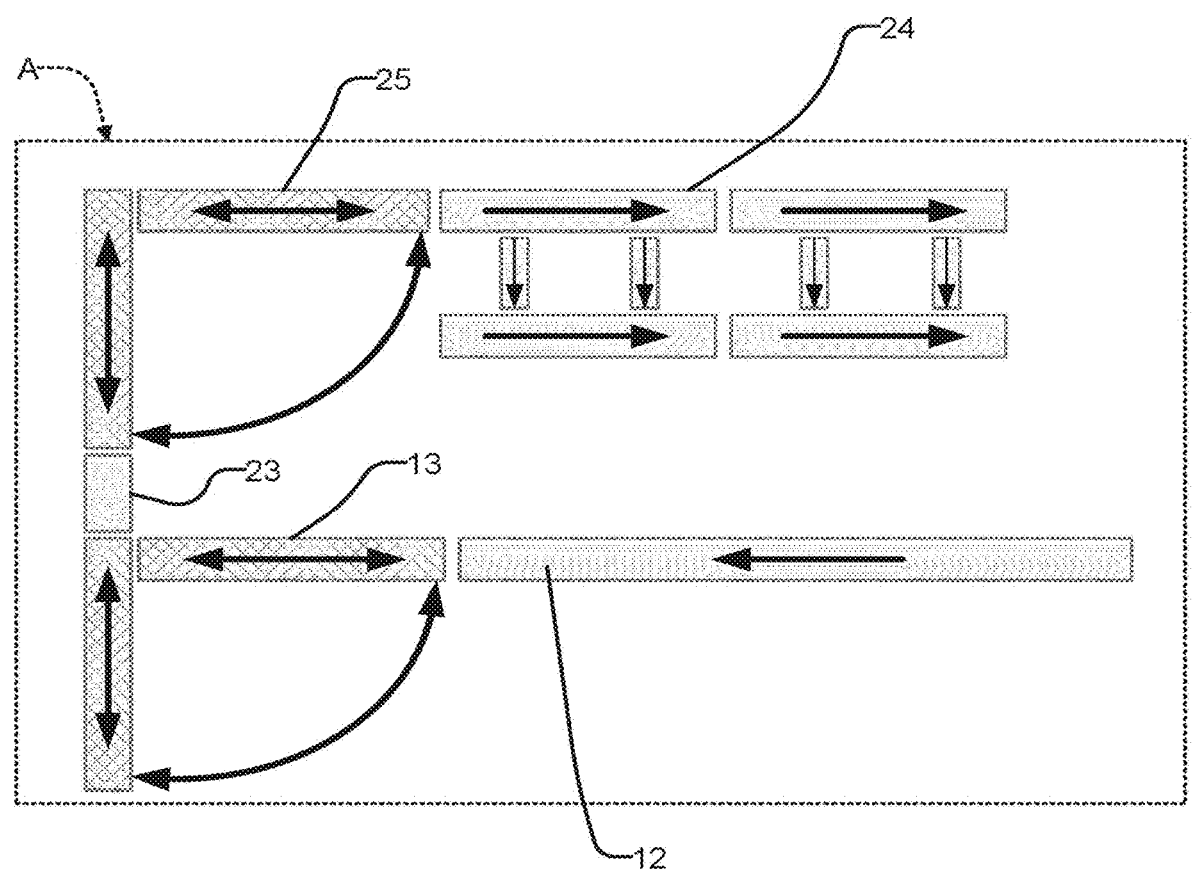
FIGS. 1A and 1B show expanded views of areas A and B in FIG. 1.
Figure 1B:
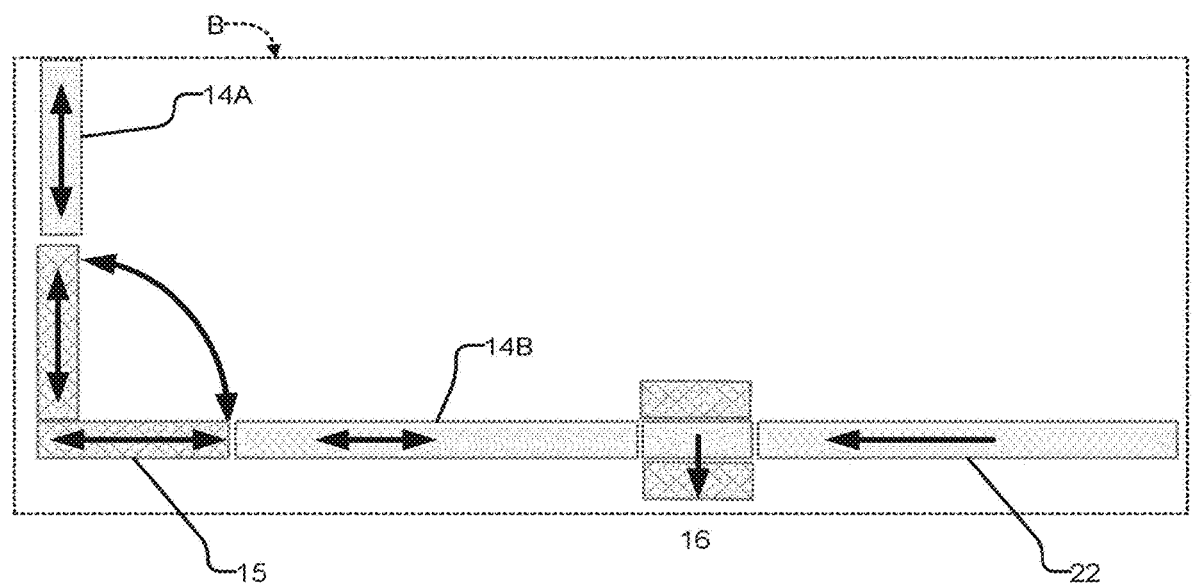

Region A of FIG. 1 is shown expanded in FIG. 1A and region B is shown expanded in FIG. 1B. FIGS. 1, 1A, 1B are example configurations or layouts for the components, equipment, regions, and areas of the automated growing system. There may be other layouts for the components, equipment, regions, and areas in other embodiments.

The cultivar in the growing channels are moved by the planting room conveyor belt 12 onto a pivoting conveyor belt 13, as shown in FIG. 1A. After receiving a channel, the pivoting conveyor belt 13 then stops, pivots 90 degrees about an axis at one end thereof, and reverses direction to move the channel onto a two-way conveyor assembly 14 for transporting channels to and from the growing area.

As shown in FIG. 1B, the two-way conveyor assembly comprises a longitudinal belt 14A and a lateral belt 14B connected by another pivoting conveyor belt 15. The lateral belt 14B moves the channels into a vegetative area 16 of the structure, and each channel is loaded onto one of a plurality of vegetative production lines 100. In some embodiments, the channels are automatically loaded onto the production lines with overhead cranes or other automated mechanisms.

Each production line 100 comprises integrated components for providing cultivar with water, nutrients, ventilation and light. Details of the production lines 100 are discussed below with reference to FIG. 2.

Figure 5:
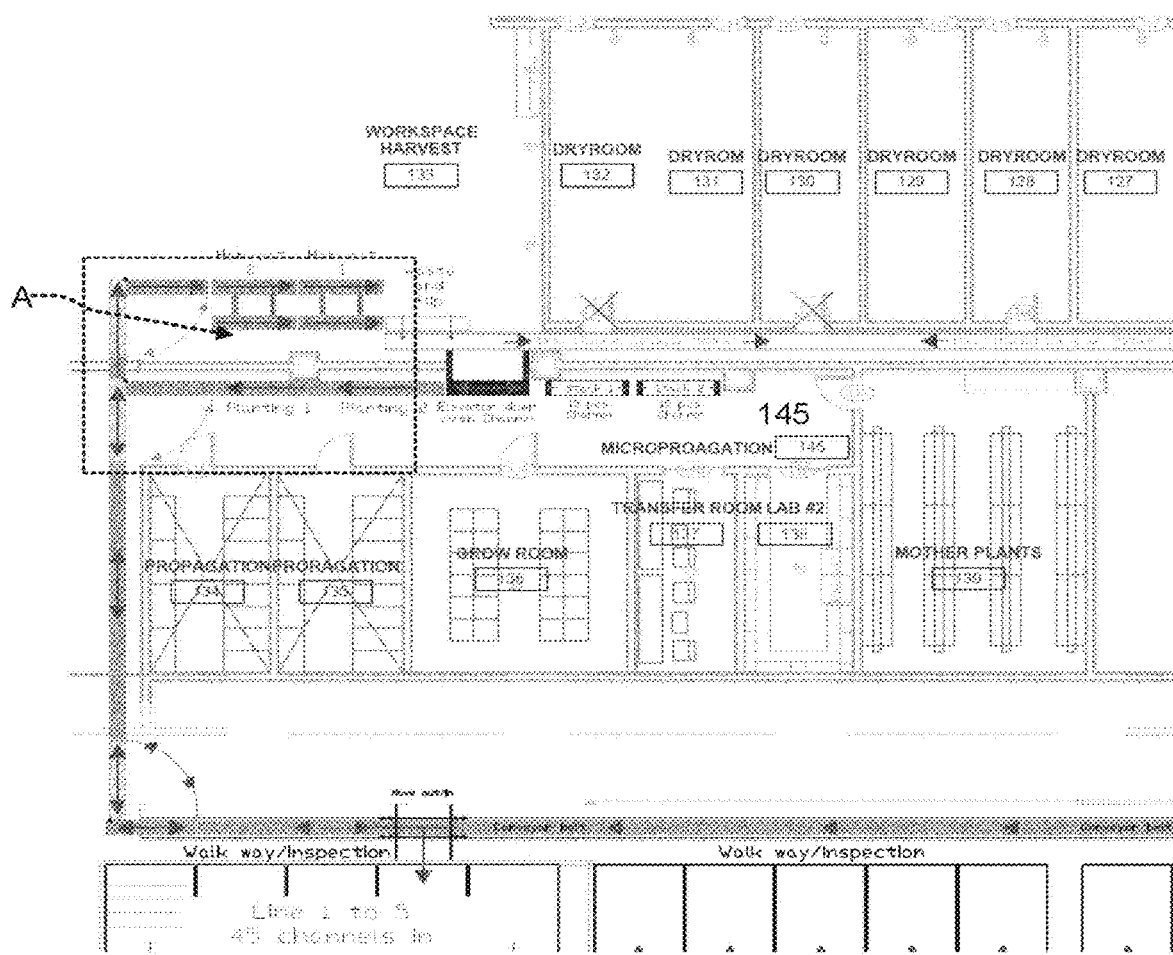
FIG. 5 is an expanded view of the automated growing system of FIG. 1.

Micropropagation areas 145 are shown in FIG. 5 (an expanded view of a portion of FIG. 1) which can also include conveyor belts. Growing channels 200 can be loaded with pods containing cultivars and placed onto conveyor belts. Before being loaded into the channels 200, cultivars mature within the micropropagation areas 145. Region A of FIG. 5 is shown expanded in FIG. 1A.

The lighting and environmental conditions of the micropropagation area 145 can be separately and/or uniquely controlled by automated control systems to support the cultivars. For example, grow room and acclimation room lighting periods can be 18 hours light and 6 hours dark. In some embodiments, the micropropagation areas 145 are split into distinct sections with separate lighting controls, and the cultivar spends approximately 26 days in the first section approximately, 10 days in the second section, and approximately 10 days in the third section.

In some embodiments, the automated portable dimmable LED lighting systems in the micropropagation area 145 are configured to provide lighting spectrums in the range of 400-700 nm and illuminations in the range of 100-200 µmolm2/s. As one skilled in the art will appreciate, the particular lighting conditions may be adjusted depending on the types of cultivar being grown. In some embodiments, grow lighting instructions can be provided and controlled through a wired and/or wireless automated control system managed through Internet of Things (IoT), engineered to create optimized efficient grow lighting throughout the grow areas. In some embodiments, the control system generates daily reports of the energy usage per zone, provides recorded feedback on the lighting systems activity, and records and analyzes historical data to optimize lighting conditions and/or forecast cultivation improvements.

In the vegetative area 16, the production lines 100 move the channels from the first end to the second end (i.e. north to south in the northern hemisphere) as the cultivar grow. Over an approximately two-week period, the cultivar matures further until they are ready to flower. During this time, the cultivar is kept healthy with fertigation flowing through the channels with a total water usage of approximately 35 000 L/day. At the second end of the vegetative area 16, the channels are loaded onto a second end conveyor belt 18, then moved into a flowering area 20 and onto a plurality of flowering production lines 100.

Except for their direction of motion and speed (as discussed below), the flowering and vegetative production lines 100 may be substantially the same. In the illustrated example, there are five vegetative production lines and fifteen flowering production lines.

The lighting and environmental conditions of the vegetative area 16 and flowering area 20 can be separately and/or uniquely controlled by automated control systems. Typically, vegetative lighting periods are 18 hours light and 6 hours dark. In some embodiments, the vegetative area is split into three sections with independent lighting controls, and the cultivar spends approximately 7 days in the first section, approximately 5 days in the second section, and approximately 2 days in the third section. The three sections of the vegetative area are adjacent to each other.

In some embodiments, lighting in the vegetative area 16 and flowering area 20 is configured to provide a daily light integral (DLI) of 26-40 moles of light (mol photons) per square meter per day (mol/m2/d). In some embodiments, lighting in the vegetative area 16 and flowering area 20 is configured to provide a lighting spectrum in the range of 400-700 nm. As one skilled in the art will appreciate, the particular lighting conditions may be adjusted depending on the types of cultivar being grown. In some embodiments, proprietary supplemental grow lighting is provided, and controlled through a wired and/or wireless automated control system managed through IoT, engineered to create an optimized efficient grid of dimming zones throughout the grow area. In some embodiments, the control system generates daily reports of the energy usage per zone, provides recorded feedback on the lighting systems activity, and records and analyzes historical data to optimize lighting conditions and/or forecast cultivation improvements.

In some embodiments, environmental conditions in the vegetative area 16 include:
- 60-70% humidity
- Temperature range 68-77° F. at the canopy level
- Cooler temperature at night (5-10 degrees cooler than day temperature)
- Air movement, medium air velocity (in the range of approximately 60,000-170,000 CFM)
- Root zone temperature 64-70° F.
- CO2 supply, 1000 ppm, 0600 AM-1800 PM.

In some embodiments, the entire flowering area 20 has a single lighting stage providing a DLI of approximately 30-40 mol·m-2·d-1, as described above. To induce flowering, lighting periods are 12 hours of light and 12 hours of dark in the flowering area 20.

In some embodiments, environmental conditions in the flowering area 20 include:
- 50-60% humidity at early flowering stage
- 50%-55% humidity close to harvest (last 2-3 weeks)
- 72-77° F.
- Cooler temperature at night (5-10 degrees cooler at night)
- Air movement, medium air velocity (in the range of approximately 60,000-170,000 CFM)
- Root zone temperature 64-70° F.
- CO2 supply, 1000 ppm, 0600 AM-1800 PM.

In the flowering area 20, the production lines 100 move the channels from the second end to the first end (i.e. south to north in the northern hemisphere) as the cultivar grow. In some embodiments, the production lines 100 move the channels though the flowering area 20 over a 7 week period.

At the first end of the flowering area 20, the channels are loaded onto a first end conveyor belt 22, then moved onto the two-way conveyor assembly 14. The two-way conveyor assembly 14 moves the channels out of the growing area then back over the pivoting conveyor belt 13 onto a connecting belt 23 which moves the channels onto another pivoting conveyor belt 25, which in turn moves the channels onto a harvesting conveyor belt 24 as shown in FIG. 1B. The harvesting conveyor belt 24 delivers the channels into a harvest area, where the cultivar is cut from channels, hung on drying racks, and moved into one or more drying rooms.

After harvesting, channels continue down the assembly line, and bags (containing growing pods/stub/roots) are removed manually from channels. The bags are placed on a separate conveyor belt heading to destruction room where materials are weighed, recorded, denatured, shredded, and ejected directly outside into a composting bin. Dirty channels are sent to be cleaned through industrial washer on conveyor belt. After being cleaned, a channel lift hoists channels to a higher elevation conveyor belt heading back to the channel storage in planting room. The channel storage stores 45 channels that can be manually taken from storage and placed on conveyor back to greenhouse when required.

In some embodiments, uniquely preprogrammed automatic schedules (e.g. code, encoding) control channels entering and exiting with the most efficiency possible. 45 channels are automatically transferred onto five vegetative area production lines each morning, taking approximately 4 hours. After, 45 channels are transferred out of the greenhouse to be harvested from the flowering area production lines, taking approximately 4 hours.

Figure 2:
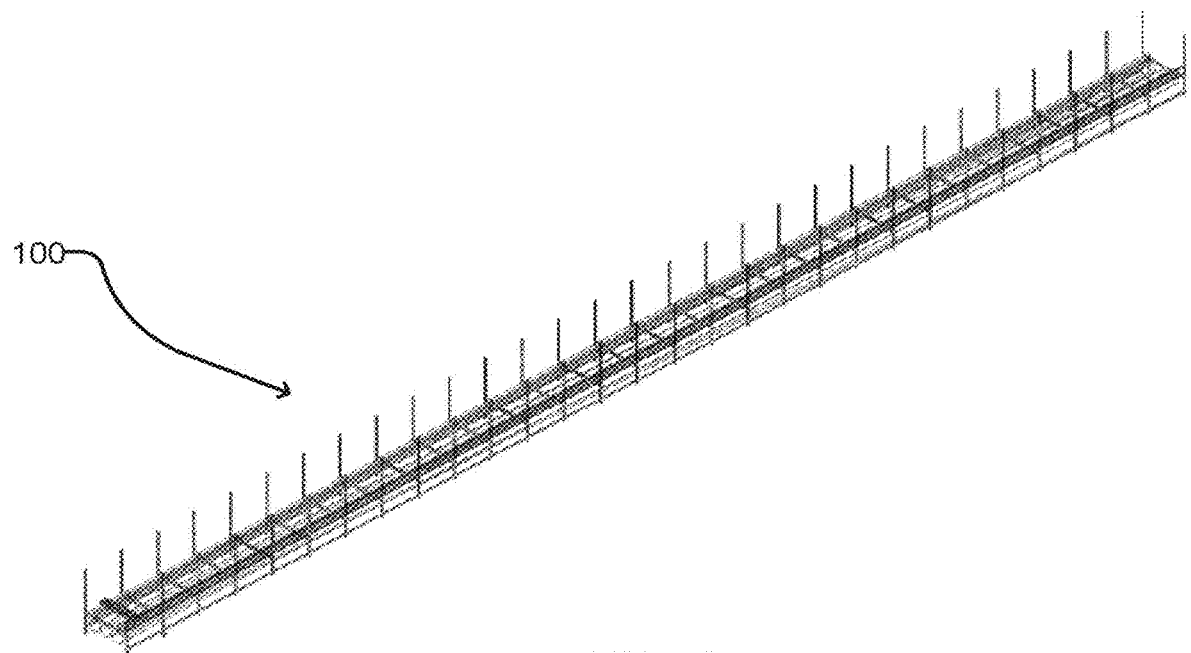
FIG. 2 shows a production line of an automated growing system according to an example embodiment of the present disclosure.
Figure 2A:
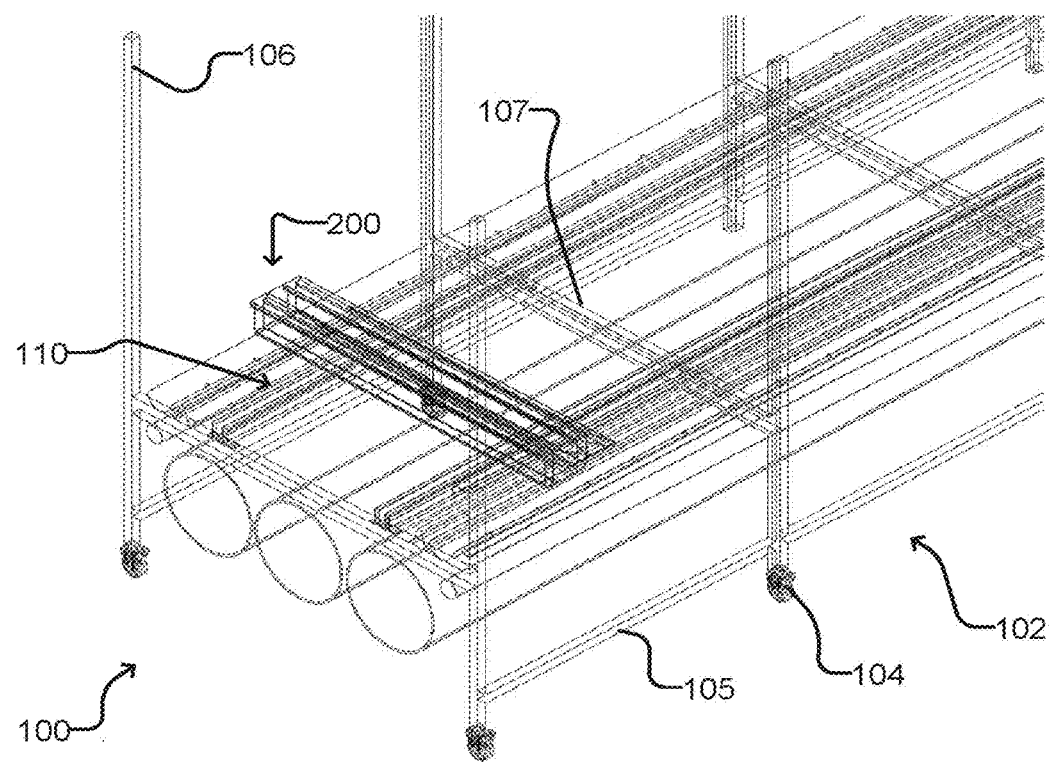
FIG. 2A is a zoomed in view of one end of the production line of FIG. 2.
Figure 2B:
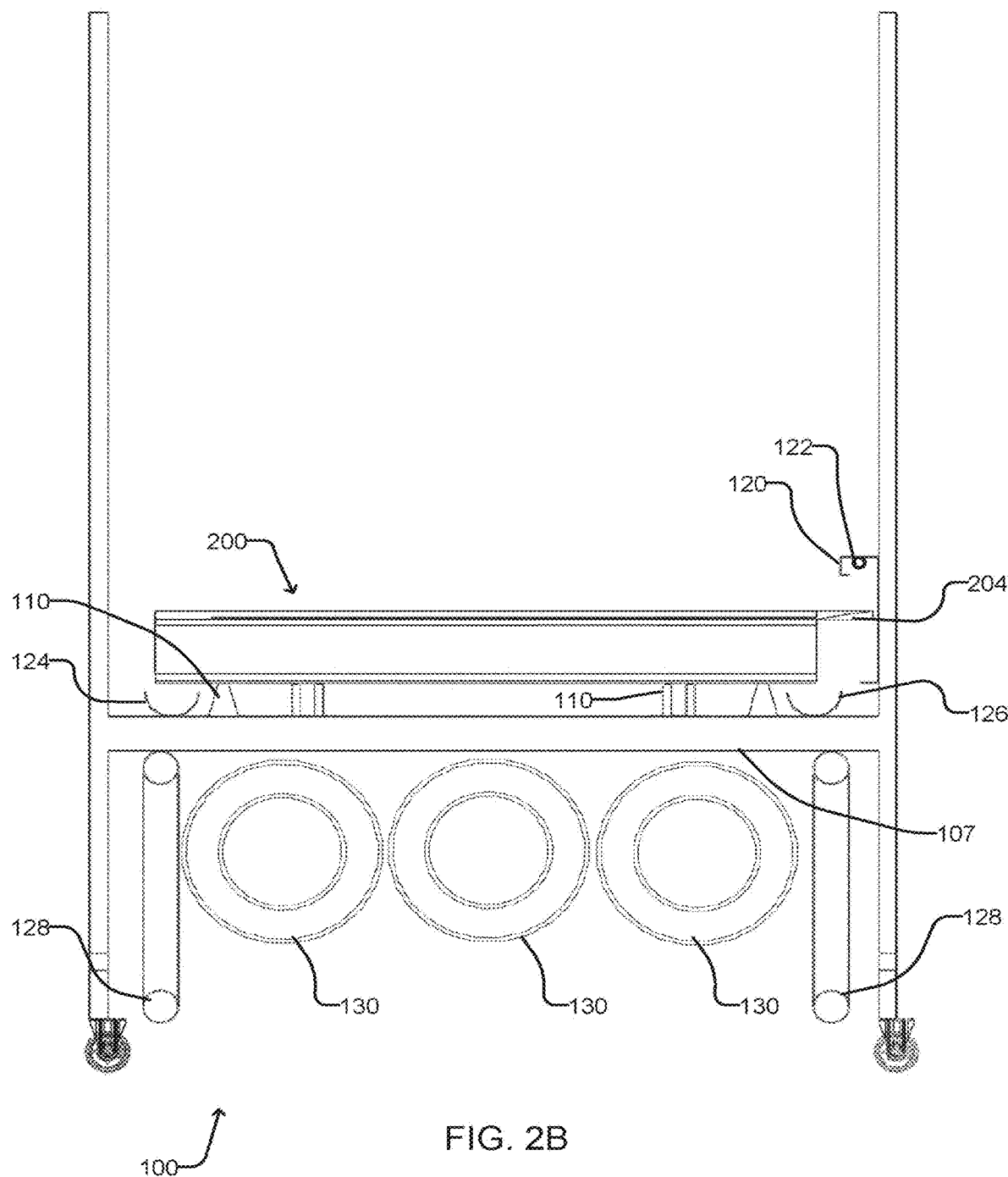
FIG. 2B is an end view of the production line of FIG. 2.

FIGS. 2, 2A and 2B show an example production line 100 of an automated growing system according to an embodiment of the present disclosure. The production line 100 comprises a frame 102 that supports a conveyor assembly 110 and other components of the production line 100. The conveyor assembly 110 is configured to receive growing channels 200 at a first end of the production line and move the growing channels to the second end of the production line. As discussed above, the first end of the production line 100 may be at either the first end or the second end of the growing area.

In some embodiments, the production lines 100 have metal frames 102 configured to support the channels, and each production line is approximately 6' 6" wide (although this could change to accommodate differently sized channels). In some embodiments, the production lines 100 have a length of approximately 187' allowing for a capacity of 140 channels per production line.

In some embodiments, the frame 102 of certain production lines 100 is mounted on rigid castors 104 such that the entire production line 100 can move laterally (i.e. in an east-west direction). Such a configuration allows for human access between every production line if needed. In some embodiments, lateral movement of production lines 100 is effected by motors that are controlled by an automated growing system (AGS) control system that controls all aspects of the production, including the operation of production lines, and includes safety protocols configured such that lateral movement of a production line is only possible when automated longitudinal movement of the channels on the production line is disabled. In some embodiments, the production lines on either side of the vegetative area 16 and flowering area 20 are stationary (i.e., the first, fifth, sixth and twentieth production lines in the FIG. 1 example), acting as lateral movement barriers. The rest of the production lines can be moved to create a walking path while entire automation is suspended. They must be returned to original positions before automation can be resumed.

In the illustrated example, the frame 102 comprises a plurality of vertical posts 106 at regularly spaced intervals along opposed lateral sides thereof, with longitudinal cross-members 105 and lateral cross-members 107 extending therebetween. The conveyor assembly 110 is supported on the lateral cross-members 107. Lighting sources (not shown) may be connected to the frame 102 (e.g. mounted on posts 106), along with a canopy for stabilization if needed.

A mounting bracket 120 extends longitudinally along the frame 102 supported by the vertical posts 106 on one lateral side of the frame, and supports a fertigation delivery line 122 positioned above fertigation receiving structures 204 (e.g. basins, as discussed below) of the growing channels. The fertigation delivery line 122 comprises equally spaced regulators (not shown) configured to release nutrients into the fertigation receiving structures of the channels that deliver the mixture to the cultivar. Fertigation delivers a unique mixture of valuable nutrients, including but not limited to, trace minerals, folic acid, oxygenated nano-bubbles, and structured water to channels containing cultivar. In some embodiments, the fertigation delivery line 122 is provided with water and nutrients from a supply system, which receives water from the city main into a water storage tank. The storage tank has a pressure sensor wired and connected to the control system. A PVC suction line carries water between the water tank and a fertilizer unit in the fertigation room. In some embodiments, a reverse osmosis unit is also connected to the freshwater tank. In some embodiments, the unit utilizes nanobubbles and structured water to ensure maximum yield. The fertigation unit automatically mixes concentrated fertilizer (wet or dry) into fertigation delivery lines 122 heading to greenhouse. In some embodiments, each production line 100 has an individually controlled nutrient supply.

A drainage trough 124 is supported on the opposite lateral side of the frame as the delivery line 122. The drainage trough 124 is positioned below drains of the growing channels to capture fluid draining therefrom. In some embodiments, a secondary drainage trough 126 is provided on the same side of the frame as the delivery line 122, to catch fluid that may fall from regulators without a growing channel directly below. Additional water return lines 128 may be provided in the lower portion of the production line 100.

One or more air supply ducts 130 (three in the illustrated example) are supported by the frame under the conveyor assembly. In some embodiments, the ducts 130 are suspended from the undersides of the lateral cross-members 107. In some embodiments, each duct 130 comprises a frustum of a hollow cone, i.e. a hollow structure extending along a longitudinal direction (defined by an axis extending between the first and second ends of the frame 102) and having circular lateral cross-sections. The diameter of the circular cross-sections decreases along the longitudinal direction, specifically the diameter decreases with distance from the inlet end of the duct 130, i.e. the diameter decreases in the direction of the air flow through the frustum. In some embodiments, each duct 130 is constructed from ethylene tetrafluoroethylene (ETFE).

Each air supply duct 130 comprises a plurality of openings (not shown), such as for example nozzles along an upper portion thereof, for delivering conditioned air to cultivar growing in the growing channels. In some embodiments, four 0.6" Ø nozzles are spaced every 10° on the top 40° of each duct, and a set of four nozzles are located every 4"-7" along the length of the duct. Nozzles diffuse conditioned air under cultivar and providing canopy with ideal air quality.

In some embodiments, the air delivered to cultivar though supply ducts is controlled for temperature, CO2 content, and humidity, and may undergo sanitization treatment utilizing ultra-violet germicidal irradiation. In some embodiments, each air supply duct 130 has a flex connect/disconnect to main facility HVAC supply ducts. Air handling units (AHU) positioned, for example, on the roof of the head house, filter and condition air provided to the supply ducts. The AHUs also receive air from the growing area by means of exhaust air intake ducts located on demising wall. In some embodiments, in order to condition air correctly, the AHUs are provided with preprogrammed ideal condition settings, and automatically communicate with multiple sensors, supplemental lighting, other elements of the structure (e.g. dynamic foam insulation controls), and the building management system to calculate optimal microclimate conditions for the cultivar being grown. In some embodiments, the greenhouse control system also communicates with Marijuana Enforcement Tracking Reporting Compliance (METRC), for tracking/monitoring production of *cannabis*.

In some embodiments, each system in the greenhouse has its own control system. Each uniquely coded control system interacts with each other to produce an environment for maximum yield. This is achieved with a unique control system integration. With this technology, the greenhouse automatically adjusts its microclimate properties with outdoor conditions and time of day. Control systems automatically relay information to METRC for tracking/monitoring.

Figure 3:
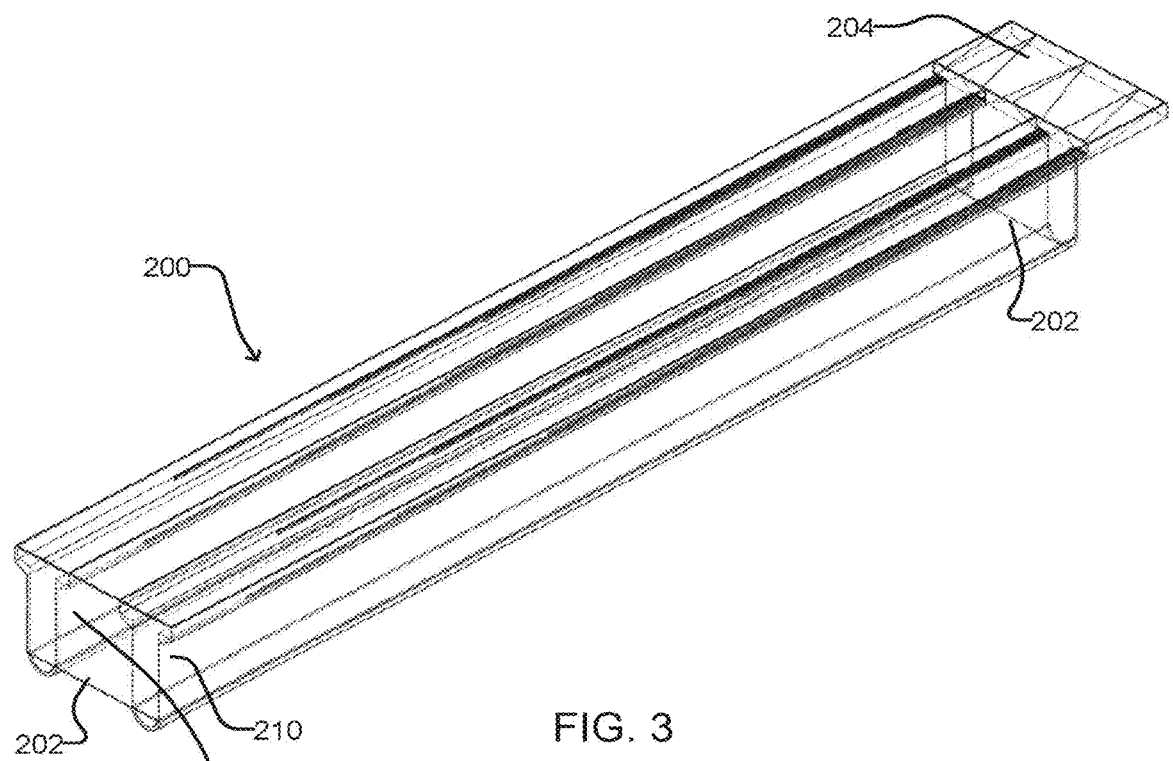
FIG. 3 shows a growing channel of an automated growing system according to an example embodiment of the present disclosure.
Figure 3A:
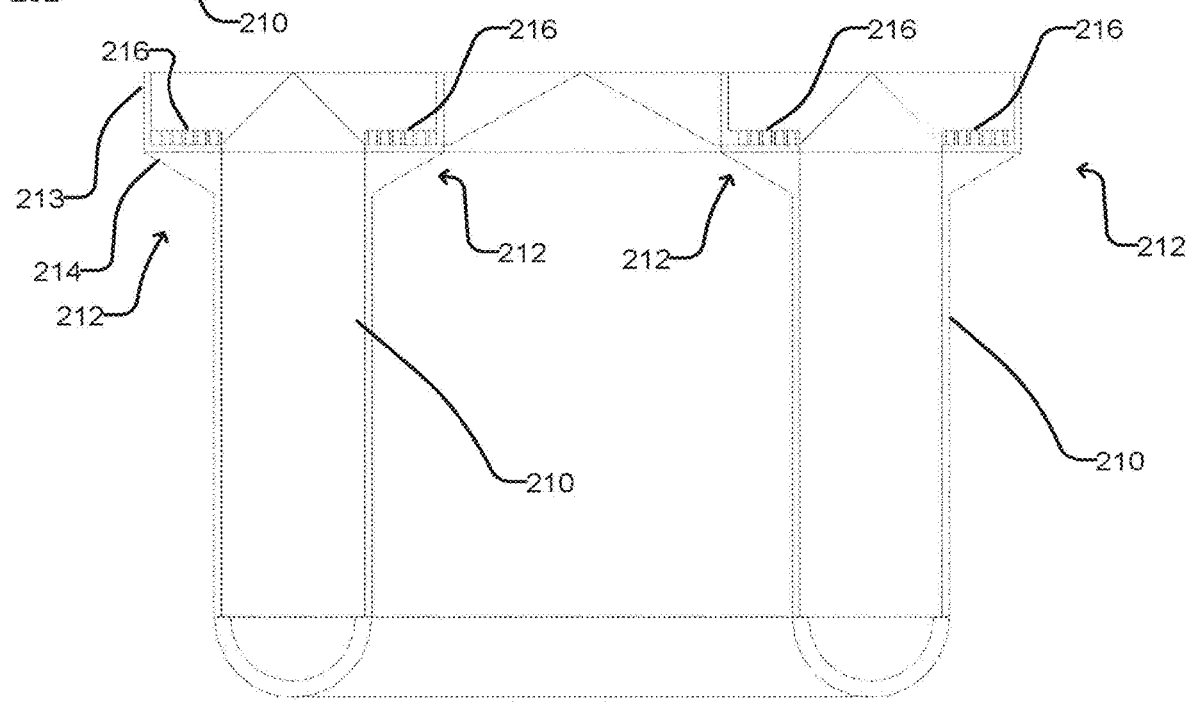
FIG. 3A is an end view of the growing channel of FIG. 3.

FIGS. 3, 3A and 3B show an example growing channel 200 of an automated growing system according to one embodiment of the present disclosure. The channel 200 is particularly suited for growing cultivar using "sea of green" (SOG) growing techniques. In the illustrated example, the channel 200 comprises a pair of parallel growing troughs 210 held together by a pair of end plates 202. The end plates 202 substantially prevent relative motion between the channels. In some embodiments, the troughs 210 may also be held together by interstitial supports (not shown). By including a pair of troughs 210, the channel 200 is inherently stable and sits upright when placed on a flat surface. In other embodiments, a channel could comprise only a single trough 210 supported by another structure (e.g. a flat base, a plurality of legs, etc.). In other embodiments, a channel may comprise more than two troughs 210.

A fertigation receiving structure 204 is provided at one end of the growing channel 200, in the form of a basin in the illustrated example. The fertigation receiving structure 204 and the basin will be referenced using the same numeral (204), however it is to be understood that basins are type of instantiation of the general class of fertigation receiving structures. The basin (or fertigation receiving structure) 204 may comprise a plurality of angled surfaces shaped to direct fluid to flanges 212 of the troughs 210 using gravity, as described below. In some embodiments, at the opposite end of the growing channel 200, the end plate 202 does not cover the bottom portions of the troughs 210, such that fluid can drain out of the troughs 210. In other embodiments, the troughs 210 have drainage outlets 211 near the ends thereof opposite basin 204, as shown in FIG. 3B. In some embodiments, the drainage outlets 211 may be drainage holes.

Each trough 210 is at a slight incline such that fluid flows along the upper surface thereof, with the end adjacent to the basin 204 higher than the opposite end, and has a pair of flanges 212 extending outwardly therefrom. Each flange 212 has an outer wall 213 to contain fluid, and an angled (non-horizontal) underside 214 beveled at approximately 30 degrees to allow air rising from supply ducts to flow vertically to cultivar. In some embodiments, the underside 214 may be a different non-horizontal shape. The flanges 212 have a plurality of leach lines 216 formed on the upper surface thereof to direct fluid to a plurality of different locations along the troughs 210, as described below.

In some embodiments, each growing channel 200 comprises two 7.5" deep troughs 210 made of extruded PVC with a 2" base width and side walls that have a 1° vertical draft. A trough has a bottom portion connecting the side walls (or lateral edges), the bottom portion extending along a longitudinal direction from the first end to the second end of the trough. In some embodiments, the bottom portion may be curved to lower resistance to air flowing from the underside towards the topside of the trough, and also to discourage turbulence in the air. The bottom portion may have a semi-circular cross-section normal to the longitudinal direction. The bottom portion may comprise the bottom 1" of the trough 210, and may have a radius of 1" so a rectangular body with a 2" width placed in the trough 210 sits 1" above the bottom of the trough 210. In some embodiments, the trough 210 has detents in place configured to hold a rectangular body above the bottom of the trough 210. The trough 210 is configured to hold a plurality of growing pods (sometimes referred to as simply "pods") that contain cultivar and growing medium. In some embodiments, each growing pod comprises a growing medium pressed into a rectangular block having initial dimensions of 2" by 2" by 6". The pod may also comprise a bag or other wrapper made from a fibrous, water permeable, biodegradable material around the block of growing medium. In some embodiments, the growing medium comprises coconut concentrate or "coir". Different or additional growing mediums may be provided in other embodiments. A variable diameter cavity located on the top face of the block of growing medium holds a single plantlet of cultivar. The trough depth allows for each pod to expand vertically when fluid is introduced. In some embodiments, each trough 210 is 6' long to allow space for twelve pods, such that twenty-four growing pods can be loaded into a growing channel 200, and the troughs 210 have a spacing of 4" between their flanges. In some embodiments, the basin 204 comprises a vacuum formed polyvinyl chloride (PVC) component with dimensions 12" by 6" by 1.5", and is chemically welded to the troughs 210.

As shown in FIG. 3C, in which the basin 204 is omitted and the trough 210 is shown stretched in the lateral dimension to illustrate the different lengths of the leach lines 216, in some embodiments each leach line 216 extends from the end of the channel 200 with the basin to a position at the interface between two adjacent growing pods 220. In some embodiments, each flange 212 comprises six leach lines 216, and each leach line 216 leads to an interface between growing pods 220, with the exception of one leach line 216 leading to the beginning of the first growing pod 220. Leach lines 216 terminating closer to the basin 204 are positioned closer to the inside of the flange 212. At the termination of each leach line 216, the wall or other structure forming the leach line 216 ends allowing fluid to flow toward the middle of the trough 210, providing nutrients to the growing pods. Without wishing to be bound by theory, directing nutrients to the growing pod interfaces may benefit the cultivar by forcing the roots to grow further to reach nutrients.

Figure 3D:
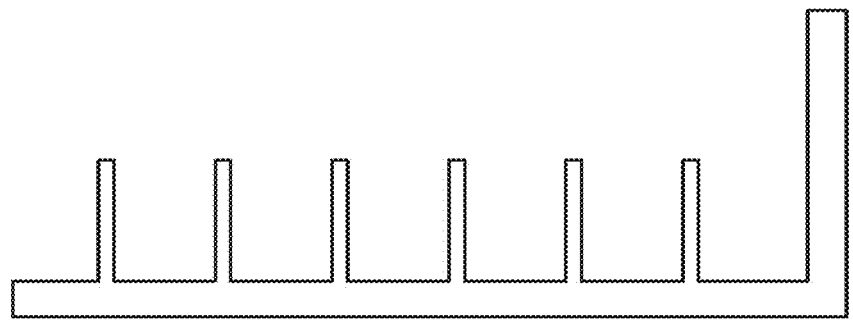
FIGS. 3D, 3E and 3F show sectional views of example growing channel flanges with three different configurations of leach lines.
Figure 3E:
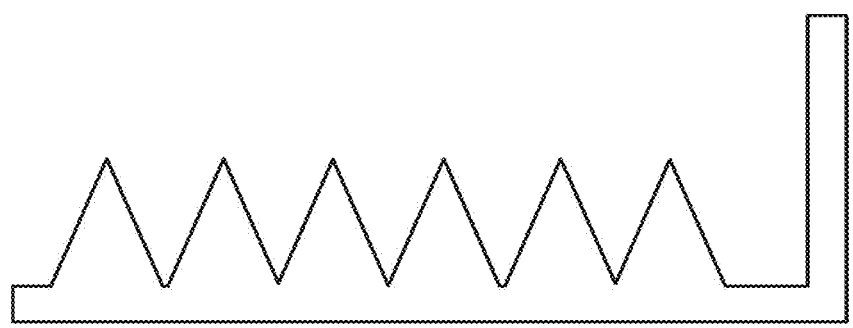
Figure 3F:
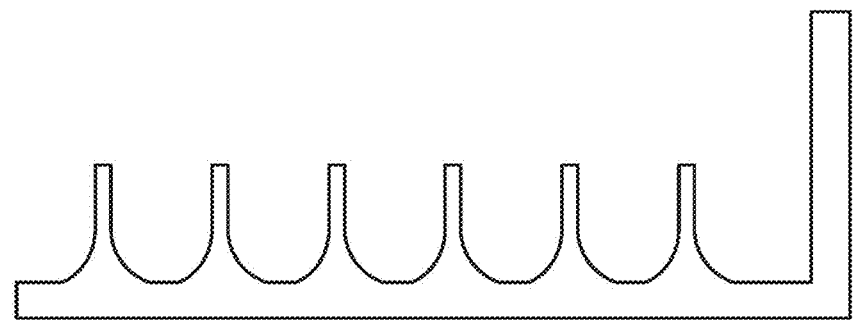

In some embodiments, the leach lines 216 are formed by a plurality of vertical walls defining a plurality of rectangular channels, as shown for example in FIG. 3D. In some embodiments, the leach lines 216 are formed by a plurality of angled walls defining a plurality of triangular channels, as shown for example in FIG. 3E. In some embodiments, the leach lines 216 are formed by a plurality of curved walls defining a plurality of U-shaped channels, as shown for example in FIG. 3F.

In some embodiments, troughs 210 are formed by extruding PVC with a constant cross-section defining the shapes of the flanges and leach lines, and then cutting each trough 210 to size, and the lengths of the leach lines 216 are adjusted by cutting away an appropriate length of material of the wall or other structure. In some embodiments, troughs 210 may be formed in other ways, such as for example by cutting or etching leach lines into the upper surfaces of the flanges.

Figure 4:
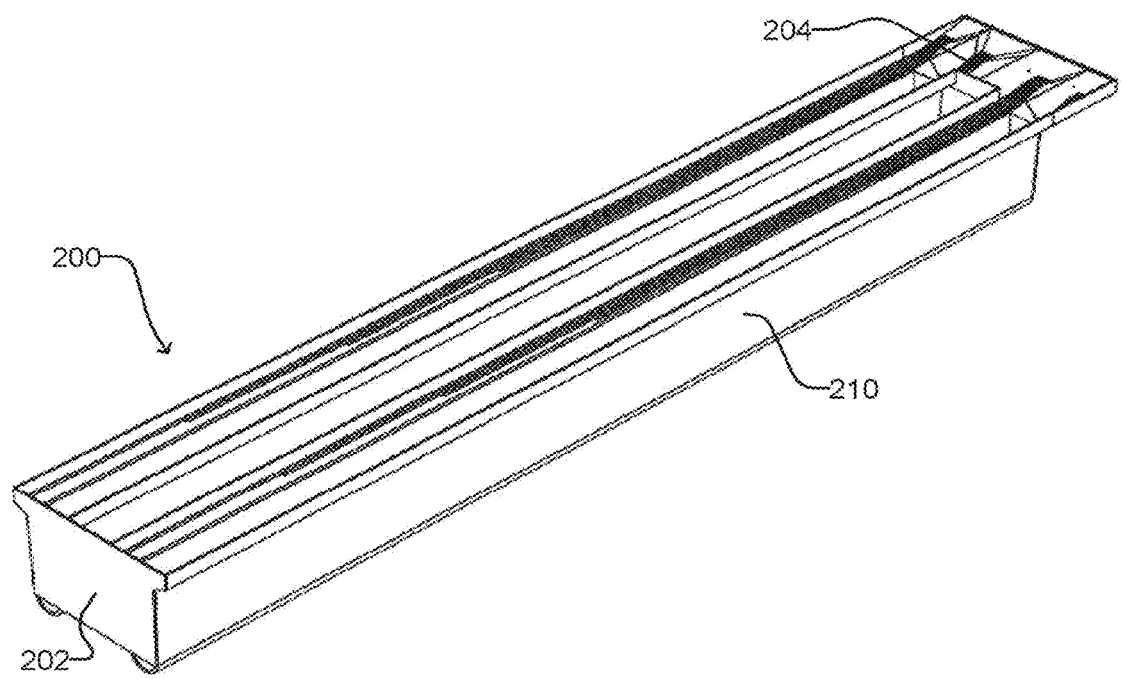
FIG. 4 shows a growing channel of an automated growing system according to an example embodiment of the present disclosure.

FIG. 4 shows another example growing channel 200 of an automated growing system according to an example embodiment of the present disclosure.

In the illustrated example, the channel 200 comprises growing troughs 210 held together by a pair of end plates 202. The end plates 202 substantially prevent relative motion between the channels. By including a pair of troughs 210, the channel 200 is inherently stable and sits upright when placed on a flat surface. A fertigation receiving structure 204 is provided at one end of the growing channel 200 which is in the form of a basin with an improved structure for receiving and directing fertigation material. The fertigation receiving structures 204 have channels shaped to direct fertigation liquid into holes and equitably distribute the fertigation liquid through leach lines.

Each trough 210 is at a slight incline such that fluid flows along the upper surface thereof, with the end adjacent to the basin 204 higher than the opposite end, and has a pair of flanges 212 extending outwardly therefrom. Each flange has an outer wall to contain fluid, and an angled (non-horizontal) underside beveled to allow air rising from supply ducts to flow vertically to cultivar. In some embodiments, the underside may be a different non-horizontal shape.

Figure 4A:
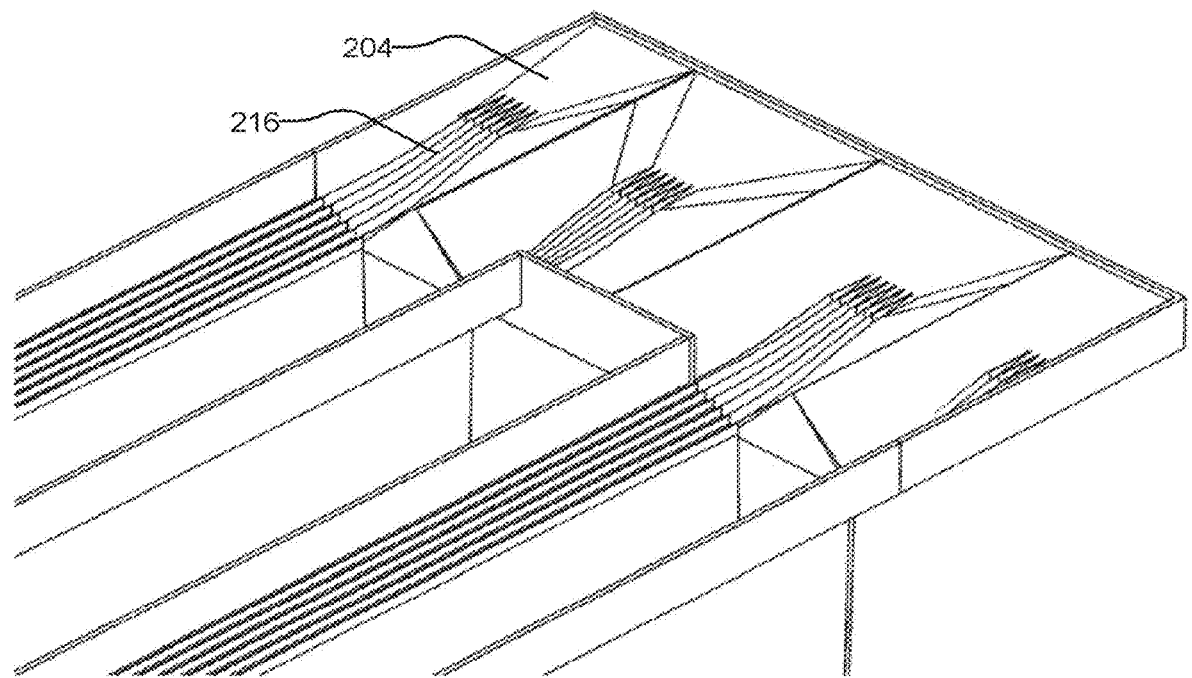
FIG. 4A is an expanded view of the growing channel of FIG. 4 showing the fertigation receiving structures in greater detail.

FIG. 4A is an expanded view of the growing channel of FIG. 4 showing the fertigation receiving structures 204 with flanges that leach lines 216 formed on the upper surface thereof to direct fluid to a plurality of different locations along the troughs 210. The fertigation receiving structures 204 have channels to direct fluid into leach lines 216 (e.g. holes) and equitably distribute the fluid (or fertigation) through leach lines 216. The fertigation receiving structure 204 can be referred to as a basin however it is to be understood that basins are type of instantiation of the general class of fertigation receiving structures. The basin (or fertigation receiving structure) 204 may comprise a plurality of angled surfaces shaped to direct fluid to flanges of the troughs 210 using gravity. A portion of the fertigation receiving structures 204 can be inclined with angled surfaces such that fluid flows through the leach lines 216 and is distributed within the troughs 210.

Figure 4B:
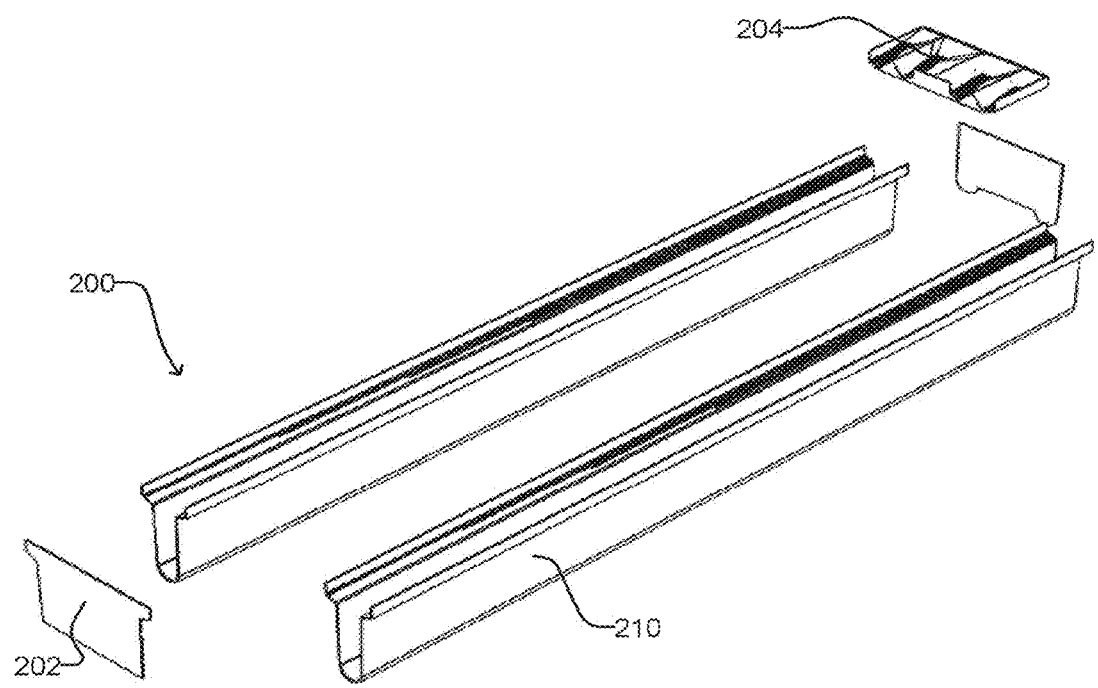
FIG. 4B is an exploded view of the growing channel of FIG. 4 showing the individual components.

FIG. 4B is an exploded view of the growing channel of FIG. 4 showing the individual components. The underside of the channels are diagonal to focus the air movement from coming below the channels 200.

Figure 4C:
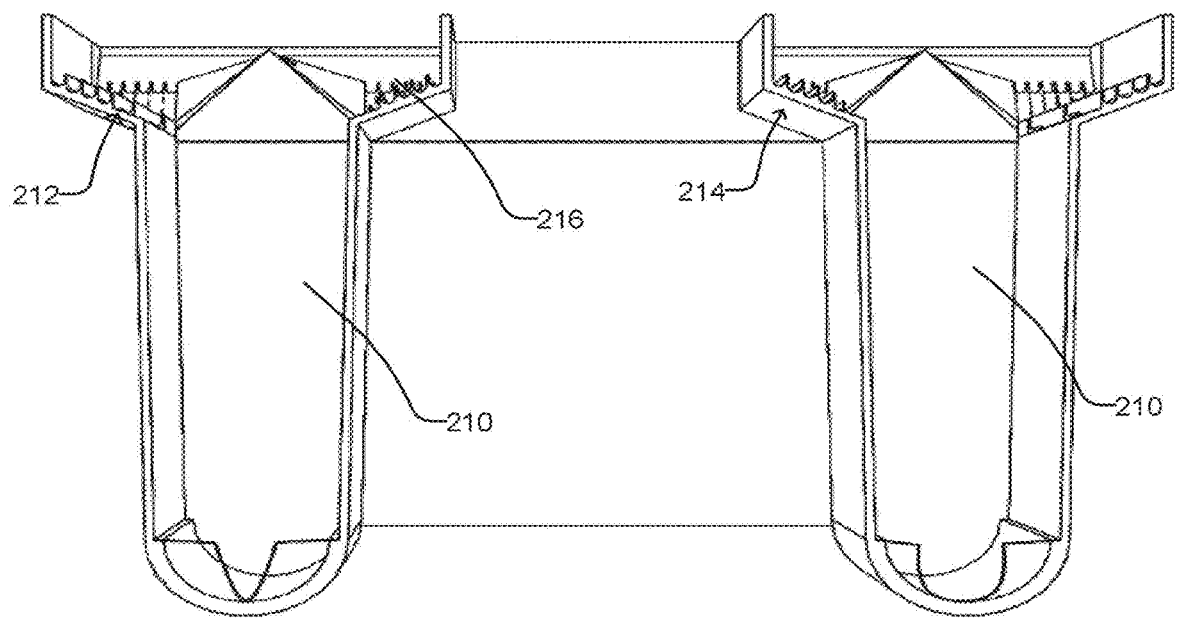
FIG. 4C is a section view of the growing channel of FIG. 4 with two different configurations of the growing troughs indicated with lines.

FIG. 4C is a section view of the growing channel 200 of FIG. 4 with two different configurations of the growing troughs 210 as indicated with lines. The channel 200. The fertigation receiving structure 204 may comprise a plurality of angled surfaces shaped to direct fluid to flanges 212 of the troughs 210 using gravity. Each trough 210 is at a slight incline such that fluid flows along the upper surface thereof, with the end adjacent to the basin 204 higher than the opposite end, and has a pair of flanges 212 extending outwardly therefrom. Each flange 212 has walls to contain fluid, and an angled (non-horizontal) underside beveled to allow air rising from supply ducts to flow vertically to cultivar. In some embodiments, the underside may be a different non-horizontal shape. The flanges 212 have a plurality of leach lines 216 formed on the upper surface thereof to direct fluid to a plurality of different locations along the troughs 210. Each flange 212 has an angled (non-horizontal) underside 214.

FIG. 4C shows lines for different configurations or variations of the drain channel of the growing troughs 210. There are various trough drain profiles (profile lines shown in this example) possible, depending on cultivar, growing pods 220, fertigation flow rate, differential angle of the conveyor assembly 110, and other factors.

Embodiments described herein provide channels 200 for growing a plurality of plants. Each channel 200 can have a trough 210 with a first end, a second end, and a pair of opposed lateral edges extending between the first end and the second end. The trough 210 can be held at an incline such that the first end is higher than the second end. The channel 200 has a flange 212 extending laterally from each of the pair of opposed lateral edges of the trough 210. Each flange 212 has leach lines 216 on an upper surface thereof, each leach line 216 extending a different predetermined distance from the first end toward the second end. The channel has a fertigation receiving structure 204 attached to the first end of the trough and configured to direct fluid falling therein into the leach lines of each flange.

In some embodiments, an underside of each flange 212 is beveled at an angle from the horizontal to direct air around the trough.

In some embodiments, the trough 212 is configured to hold at least 12 growing pods, each growing pod comprising a block of growing medium having a plantlet placed therein.

In some embodiments, the fertigation receiving structure 204 comprises a basin having a plurality of angled surfaces to direct fluid falling therein to the leach lines using gravity.

In some embodiments, the channel 200 has one or more drainage outlets proximal to the second end of the trough.

In some embodiments, the fertigation receiving structure 204 is a polyvinyl chloride (PVC) component chemically welded to the trough.

In some embodiments, each flange 212 has at least five leach lines.

In some embodiments, each leach line 216 is defined between two vertical walls. In some embodiments, each leach line 216 is defined between two angled walls.

In some embodiments, each leach line is defined within a U-shaped channel.

Embodiments described herein provide a channel assembly with at least two channels 200. The channel assembly can have one or more end plates connecting the at least two channels 200 to prevent relative motion between the channels 200.

Embodiments described herein provide a production line for an automated growing system. The production line can have a frame having a first end and a second end. The production line can have a conveyor assembly supported by the frame, the conveyor assembly configured to receive growing channels at the first end and move the growing channels toward the second end.

The production line can have a fertigation delivery line supported by the frame. The fertigation delivery line can extend between the first and second ends and positioned above and to a first lateral side of the conveyor assembly, the fertigation delivery line comprising a plurality of regulators spaced therealong for depositing fluid into fertigation receiving structures of the growing channels;

In some embodiments, a drainage trough is supported by the frame, the drainage trough extending between the first and second ends and positioned to a second lateral side of the conveyor assembly. In some embodiments, an air supply duct supported by the frame, the air supply duct extending between the first and second ends and positioned under the conveyor assembly, the air supply duct comprising a plurality of openings therein for delivering conditioned air to plants growing in the growing channels.

In some embodiments, the air supply duct has a frustum of a hollow cone connected to receive a flow of conditioned air therein, the frustum having circular cross-sections perpendicular to a an axis extending between the first and second ends, the circular cross-sections having decreasing diameter in the direction of an air flow through the frustum.

In some embodiments, the air supply duct is constructed from ethylene tetrafluoroethylene (ETFE).

In some embodiments, the production line has at least two air supply ducts positioned under the conveyor assembly.

In some embodiments, the production line has a system for filtering and conditioning air delivered to plants growing in the growing channels, the system controlling at least one of air temperature, $CO_2$ content, and humidity.

In some embodiments, the production line has a system for sanitizing air delivered to plants growing in the growing channels, using ultra-violet germicidal irradiation.

In some embodiments, the production line has a reverse osmosis unit for filtering fluid to be delivered to the fertigation delivery line.

In some embodiments, the production line has a fertigation unit for mixing fertilizer in fluid to be delivered to the fertigation delivery line.

In some embodiments, the production line has a nanobubble unit to introduce gas bubbles in fluid to be delivered to the fertigation delivery line.

In some embodiments, the production line has a second drainage trough position to a first lateral side of the conveyer assembly.

In some embodiments, the production line has a control system for controlling a microclimate around the production line using conditioned air supplied through the air supply duct.

In some embodiments, the production line has rigid castors attached to the frame to allow lateral motion of the production line.

In some embodiments, the production line has lighting sources attached to the frame.

In some embodiments, the production line has a lighting control system to control the lighting sources, based on time of day and age of plants growing in the growing channels.

Embodiments described herein provide an automated growing system with a plurality of vegetative production lines in a vegetative portion of a growing area for moving a plurality of planted growing channels from a first end of the growing area to a second end of the growing area. The automated growing system has a plurality of flowering production lines in a flowering portion of the growing area for moving a plurality of planted growing channels from the second end of the growing area to the first end of the growing area. The automated growing system has a first conveyor belt extending laterally across the second end of the growing area for moving planted growing channels from the plurality of vegetative production lines to the plurality of flowering production lines.

In some embodiments, the automated growing system has a second conveyer belt extending laterally across the first end of the growing area for moving planted growing channels to and from the vegetative and flowering production lines. The automated growing system has a two-way conveyer assembly configured to interface with the second conveyer belt for transporting growing channels to and from one or more processing rooms.

In some embodiments, the automated growing system has overhead cranes for moving growing channels to and from the first conveyer belt, and to and from the second conveyer belt.

In some embodiments, the automated growing system has least five vegetative production lines and fifteen flowering production lines.

In some embodiments, the number of flowering production lines is at least three times the number of vegetative production lines.

In some embodiments, the automated growing system has one or more lighting control systems, a first lighting system for the vegetative area, and a second lighting system for the flowering area. The first and second lighting systems each controlled separately by one or more of the lighting control systems.

In some embodiments, the first lighting system includes three lighting subsystems, a first lighting subsystem lighting a first section of the vegetative area, a second lighting subsystem lighting a second section of the vegetative area, a third lighting subsystem lighting a third section of the vegetative area, wherein each of the lighting subsystems are controlled separately by one more of the lighting control systems.

In some embodiments, the lighting control systems include one or more wireless automated control systems.

In some embodiments, the automated growing system has a control system for moving growing channels to and from the vegetative production lines, to and from the flowering production lines, and to and from the conveyer belt.

In some embodiments, the automation control system includes preprogrammed schedules determining when growing channels are moved to and from the vegetative production lines, to and from the flowering production lines, and to and from the conveyer belt.

In some embodiments, the automated growing system has vegetative and flowering production lines that include rigid castors driven by one or more motors to enable lateral motion of the production lines under control of the automation control system.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various example embodiments described herein.

The description provides many example embodiments of the inventive subject matter. Although each embodiment represents a single combination of inventive elements, the inventive subject matter is considered to include all possible combinations of the disclosed elements. Thus, if one embodiment comprises elements A, B and C, and a second embodiment comprises elements B and D, then the inventive subject matter is also considered to include other remaining combinations of A, B, C or D, even if not explicitly disclosed.

Although the embodiments have been described in detail, it should be understood that various changes, substitutions and alterations can be made herein. Moreover, the scope of the present application is not intended to be limited to the particular embodiments of the process, machine, manufacture, composition of matter, means, methods and steps described in the specification. As can be understood, the examples described above and illustrated are intended to be exemplary only.

As will be apparent to those skilled in the art in light of the foregoing disclosure, many alterations and modifications are possible to the methods and systems described herein. While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as may reasonably be inferred by one skilled in the art. The scope of the claims should not be limited by the embodiments set forth in the examples, but should be given the broadest interpretation consistent with the foregoing disclosure.

The present disclosure may be embodied in other specific forms without departing from its spirit or essential characteristics. The described embodiments are to be considered in all respects only as illustrative and not restrictive.

The invention claimed is:

1. A production line for an automated growing system, the production line comprising:
    a frame having a first end and a second end;
    a conveyor assembly supported by the frame, the conveyor assembly configured to receive growing channels at the first end and move the growing channels toward the second end;
    a fertigation delivery line supported by the frame, the fertigation delivery line extending between the first and second ends and positioned above and to a first lateral side of the conveyor assembly, the fertigation delivery line comprising a plurality of regulators spaced therealong for depositing fluid into fertigation receiving structures of the growing channels;
    a drainage trough supported by the frame, the drainage trough extending between the first and second ends and positioned to a second lateral side of the conveyor assembly; and
    an air supply duct supported by the frame, the air supply duct extending between the first and second ends and positioned under the conveyor assembly, the air supply duct comprising a plurality of openings therein for delivering conditioned air to plants growing in the growing channels.

2. The production line of claim 1, wherein the air supply duct comprises a frustum of a hollow cone connected to receive a flow of conditioned air therein, the frustum having circular cross-sections perpendicular to an axis extending between the first and second ends, the circular cross-sections having decreasing diameter in the direction of an air flow through the frustum.

3. The production line of claim 1, wherein the air supply duct is constructed from ethylene tetrafluoroethylene (ETFE).

4. The production line of claim 1, comprising at least two air supply ducts positioned under the conveyor assembly.

5. The production line of claim 1, including a system for filtering and conditioning air delivered to plants growing in the growing channels, the system controlling at least one of air temperature, $CO_2$ content, and humidity.

6. The production line of claim 1, comprising a system for sanitizing air delivered to plants growing in the growing channels, using ultra-violet germicidal irradiation.

7. The production line of claim 1, comprising a reverse osmosis unit for filtering fluid to be delivered to the fertigation delivery line.

8. The production line of claim 1, comprising a fertigation unit for mixing fertilizer in fluid to be delivered to the fertigation delivery line.

9. The production line of claim 1, comprising a nanobubble unit to introduce gas bubbles in fluid to be delivered to the fertigation delivery line.

10. The production line of claim 1, comprising a second drainage trough position to a first lateral side of the conveyer assembly.

11. The production line of claim 1, comprising a control system for controlling a microclimate around the production line using conditioned air supplied through the air supply duct.

12. The production line of claim 1, comprising rigid castors attached to the frame to allow lateral motion of the production line.

13. The production line of claim 1, comprising lighting sources attached to the frame.

14. The production line of claim 13, comprising a lighting control system to control the lighting sources, based on time of day and age of plants growing in the growing channels.

\* \* \* \* \*